United States Patent [19]

Lahiff

[11] Patent Number: 5,666,102
[45] Date of Patent: Sep. 9, 1997

[54] VEHICLE SIGNALS INCORPORATED INTO STEERING WHEEL RIM

[75] Inventor: John E. Lahiff, Farmington Hills, Mich.

[73] Assignee: United Technologies Automotive Systems, Inc., Detroit, Mich.

[21] Appl. No.: 687,155

[22] Filed: Jul. 24, 1996

[51] Int. Cl.$^6$ ........................................... B60Q 1/00
[52] U.S. Cl. .................. 340/461; 340/438; 340/462
[58] Field of Search .................... 340/461, 462, 340/438, 475, 476; 200/61.54, 61.57, 61.27

[56] References Cited

U.S. PATENT DOCUMENTS

| | | | |
|---|---|---|---|
| 2,291,159 | 7/1942 | Jacobi | 200/61.27 |
| 3,576,530 | 4/1971 | Buechler et al. | 340/476 |
| 4,518,836 | 5/1985 | Wooldridge | 200/61.54 |
| 4,835,512 | 5/1989 | Bralton | 340/457.2 |
| 5,438,314 | 8/1995 | Evans | 340/477 |

*Primary Examiner*—Jeffery Hofsass
*Assistant Examiner*—Ashok Mannava
*Attorney, Agent, or Firm*—Howard & Howard

[57] ABSTRACT

An improved display for steering wheels places display elements on the rim of the steering wheel. In this way, an operator of a vehicle is less likely to ignore display elements such as turn signals or warning lights. In one embodiment, lights are utilized to display the informational element. In a second embodiment a reconfigurable thin display, such as an LED, an LCD or an electro-luminescent display, is utilized. In either embodiment, the displayed information may change with rotation of the steering wheel.

15 Claims, 2 Drawing Sheets

VEHICLE SIGNALS INCORPORATED INTO STEERING WHEEL RIM

BACKGROUND OF THE INVENTION

This invention relates to the inclusion of vehicle signals in the rim of the steering wheel, such that the operator is made aware of the signals.

The design of steering wheels and of instrument panels in vehicles are both compromised by the need to provide operator sight lines. The steering wheel has always had constraints in the size and arrangement of spokes and rims since the operator must be able to easily see the instrument panel.

Because of this, certain displays placed on the instrument panel have been historically somewhat difficult to be seen by an operator of the vehicle. The automotive designer has typically placed displays which must be seen by an operator, such as the speedometer, fuel gauge, etc. in more prominent locations. Other types of displays, such as turn signals or warning lights, have been less prominently displayed.

Warning lights, such as low fuel, low oil, etc. are sometimes ignored by operators for undesirably long periods of time. This is undesirable.

In addition, turn signals are sometimes left on by an operator for undesirably long periods of time. Systems have been proposed in which the turn signal automatically stops after a predetermined period of time. Of course, removal of the control from the operator of a feature such as the turn signal may not always be desirable. On the other hand, leaving the turn signal on for unusual lengths of time is undesirable, not only for the operator of the vehicle, but also for the operators of nearby vehicles.

SUMMARY OF THE INVENTION

The disclosed invention displays items which must be addressed by the operator on the rim of the steering wheel. In this way, the operator is less likely to ignore the displays for any extended period. As an example, if there is a flashing turn signal indicator on the rim of the steering wheel, the operator will readily be made aware of this flashing signal, and will be more likely to turn the signal off. Similarly, if there is a low fuel or other warning displayed on the rim of the steering wheel, the operator is made very aware of the situation, and is more likely to address the problem. The inventive displays are much more prominent than the prior display location.

In a disclosed embodiment of this invention, a plurality of lights are placed on the rim. The lights may rotate with rotation of the wheel such that a vertically uppermost light is always a blinking turn signal light. The operator clearly sees the blinking light and is provided with an indication of the ongoing turn signal.

In a second embodiment, a reconfigurable thin display such as an LCD or an LED is placed on the rim of the wheel. A control communicates with the display and receives feedback of the amount of turning of the wheel. A control reconfigures the displayed elements on the display such that the display elements maintain a relatively constant orientation with respect to the horizontal. In this way, when the operator turns the steering wheel, a blinking turn signal remains at a location which is most prominent to the operator's sight line. The operator is made aware of the ongoing turn signal, and should it not stop with the end of the rotation, the operator is more likely to turn the turn signal off. Any warning lights may also move with the turn such that the warning lights are always displayed to the operator.

These and other features of the present invention may be best understood from the following specification and drawings, of which the following is a brief description.

DETAILED DESCRIPTION OF PREFERRED EMBODIMENT

Figure 1:
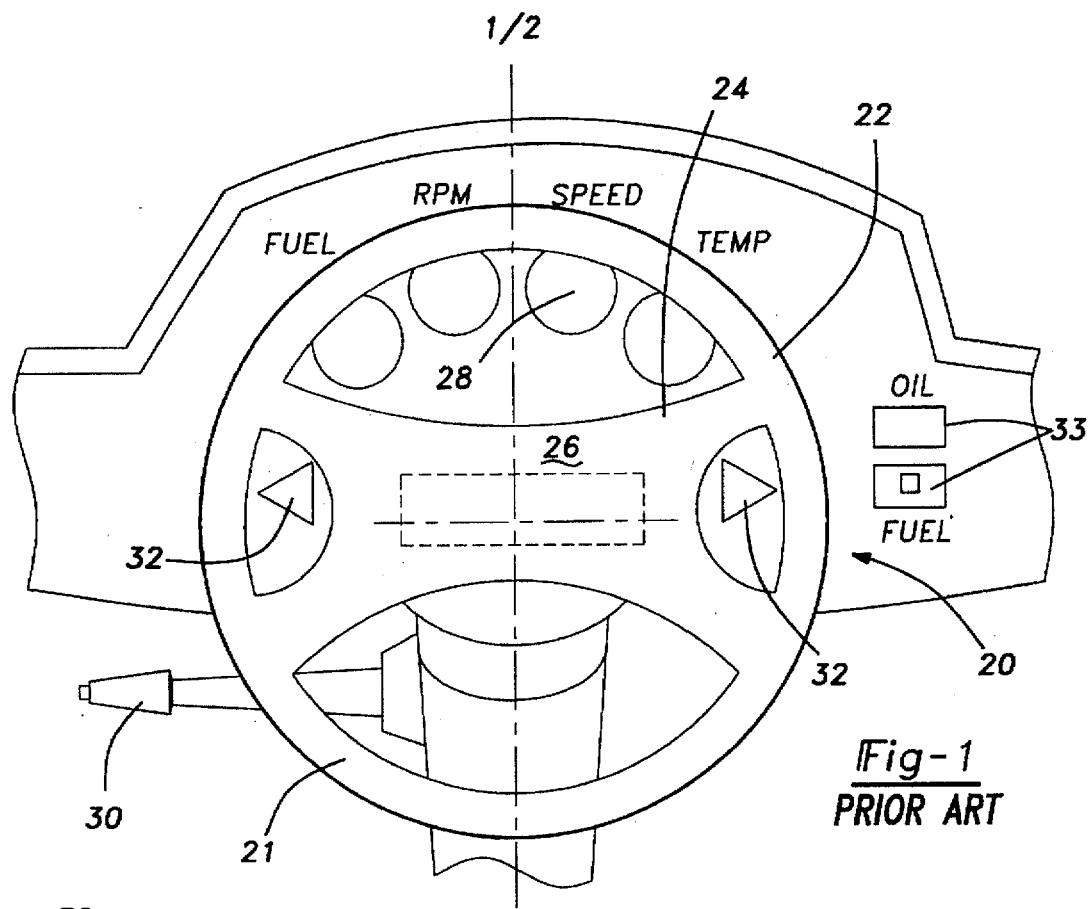
FIG. 1 shows a prior art steering wheel.

FIG. 1 shows the prior art vehicle interior 20. Steering wheel 21 has a rim 22 connected by spokes 24 to a central portion 26. The instrument panel display 28 is positioned forwardly of the wheel. The more important informational elements, such as speed, fuel level, etc. are made most prominent to the operator.

A turn signal lever 30 may actuate turn signals 32 to indicate an upcoming turn. The location of the turn signals 32 is typically less prominent. For that reason, operators have sometimes left the turn signals blinking for undue amounts of time. This is undesirable as explained above. Further, warning lights 33 are often positioned at the locations removed from the instrument panel 28. Again, these lights are less readily observed by the operator, and it would be desirable to place them in a more easily seen location.

Figure 2:
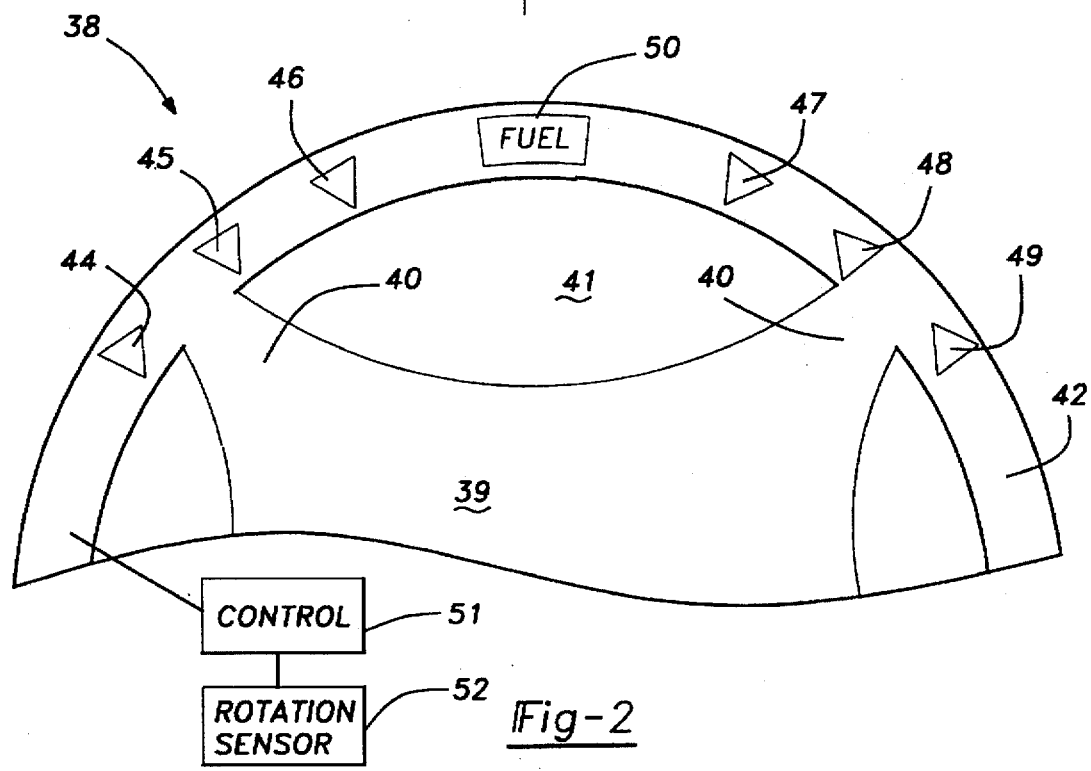
FIG. 2 shows a first embodiment of the present invention.

FIG. 2 shows a first embodiment 38 of the present invention. In first embodiment 38, the steering wheel 39 has spokes 40 leaning to a rim 42. A plurality of turn signals 44, 45, 46, 47, 48 and 49 are placed at distinct circumferential locations on the wheel. The turn signals may be incandescent lights, LEDs or other type lights. When a driver is indicating a turn in a direction, such as left-hand, the lights 44-46 would blink. As the operator turns the steering wheel 39, the lights would continue to be in a location such that they are easily observed by the operator. All three lights 44-46 may continue blinking while the wheel is turned, or, alternatively, as the wheel is turned, the lights could blink from light 46 towards light 44.

As is known, if a turn sufficiently in the right-hand direction is executed, that upon return of the steering wheel, the turn signal is turned off. However, if a less extensive turn is made, or if no turn is made, then the turn signal may continue to blink. In either case, the operator is made aware of one of the blinking lights, and is thus more likely to turn the blinking light off. In addition, a low fuel indicator 50 is placed on the rim. Other warning lights may also be utilized on the rim. The rim is the most prominent location, and it is unlikely that an operator will ignore the blinking signal lights or indicators.

A control 51 may control the selective or serial actuation of the lights 44-46 and 47-49. Control 51 receives a signal from the turn signal indicator 30 and also receives a signal from a rotation sensor 52. Rotation sensor 52 senses rotation of the steering wheel, and may control the actuation of the lights 44-46, such that at least the light which is most observable to the operator continues blinking during a turn.

Portion 41 shows the empty space between the rim 42 and the central portion 39. The space 41 is necessary since the operator still must be able to see the main informational elements on the instrument panel 28.

Figure 3:
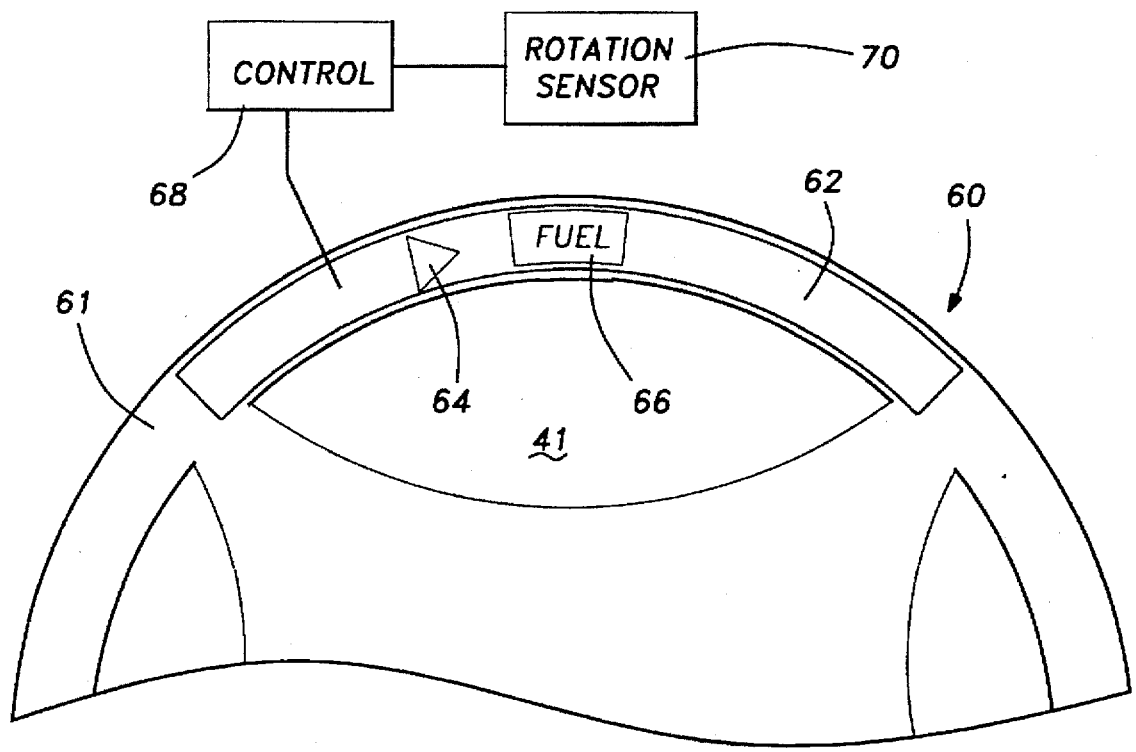
FIG. 3 shows a second embodiment of the present invention.

FIG. 3 shows a second embodiment 60. In second embodiment 60, the rim 61 incorporates a reconfigurable display 62. The reconfigurable display may be an LED, an LCD an electro-luminescent display, or any other type reconfigurable display. A turn signal 64 and a low fuel indicator 66 are shown displayed on display 62. Again, by placing these displays in an uppermost location on the rim 61 of the steering wheel, the operator is less likely to ignore the displays for any extended period of time.

Figure 4:
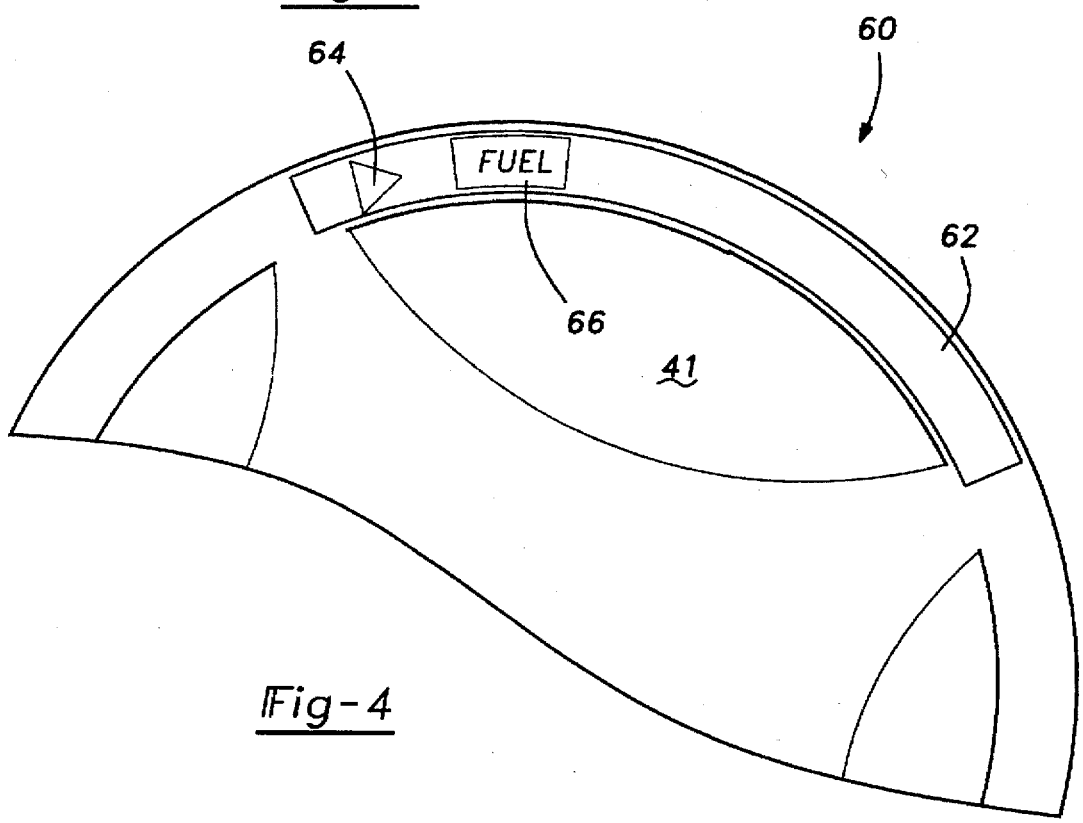
FIG. 4 shows the second embodiment during a turn.

A control 68 and a rotation feedback sensor 70 control the display information on display 62. The control adjusts the display during a turn. When the wheel begins to turn, as shown in FIG. 4, then the displayed elements 64 and 66 move with the turn such that they remain in an approximately static position in space, and clearly in the line of sight of the operator. Moreover, the displayed elements are rotated to remain parallel to the horizontal. In this way, the operator is continuously provided with reminders of the signals 64 and 66, and is continually reminded to address these signals.

The system also has an upper limit of turn to cause adjustment. That is, the system may recognize that when an operator is making a complete turn and has turned the steering wheel beyond a certain range (e.g., 60°), then it is no longer necessary to reconfigure the display. The operator is unlikely to be checking the display during such a turn. Thus, the system may end any further reconfiguration once this limit is met. The limit may be lower or greater than 60°, and may be selected by the designer of the vehicle.

The control 68 is of a type known in the art to receive signals, and to provide signals to a display to reconfigure the information displayed on the display. The technology is well within the skill of a worker in the art. It is the application and method steps which are inventive. In addition, the control is provided with signals from the main vehicle such as the indication of a warning light or an indication from signal lever 30.

If a glass cover is used for the displays, the glass is preferably shatterproof glass, or provided with shatter resistant coatings for safety purposes.

Preferred embodiments of the present invention have been disclosed, however, a worker of ordinary skill in the art would recognize that certain modifications would come within the scope of this invention. For that reason, the claims should be studied to determine the true scope and content of this invention.

I claim:

1. A vehicle steering wheel comprising:

a hub and a rim surrounding said hub, at least one spoke connecting said hub and said rim;

a control receiving an indication of an upcoming turn; and a display mounted on said rim, said display communicating with said control such that said display provides a turn signal on said rim.

2. A steering wheel as recited in claim 1, wherein said display is a light.

3. A steering wheel as recited in claim 1, wherein said display is a reconfigurable thin display.

4. A steering wheel as recited in claim 1, wherein said display further displays warning signals.

5. A display as recited in claim 1, wherein said control receives feedback of rotation of said steering wheel.

6. A steering wheel as recited in claim 5, wherein said display is adjusted with rotation of said steering wheel to maintain display elements prominent to a vehicle operator.

7. A steering wheel as recited in claim 6, wherein after a predetermined amount of turning, said control no longer adjusts said display.

8. A steering wheel as recited in claim 6, wherein said displayed elements move in opposition to rotation of said wheel such that it maintains a generally constant position in space.

9. A steering wheel as recited in claim 6, wherein said display is an LED display.

10. A steering wheel as recited in claim 6, wherein said display is an LCD display.

11. A method of displaying information on a vehicle comprising the steps of:

(1) providing a steering wheel, and display on a rim of said steering wheel;

(2) providing a control sensing an indication from the operator of an upcoming turn, said control controlling the display on said display on said rim; and (3) displaying a turn signal on said rim of said steering wheel when an operator has indicated an upcoming turn.

12. A method as recited in claim 11, further including the steps of monitoring rotation of said steering wheel, and moving the location of said displayed turn signal on said rim with a turn to maintain a generally constant location for said displayed turn signal.

13. A method as recited in claim 12, further comprising the step of setting an upper limit for adjustment of said display, and ceasing further adjustment of said display if said wheel turns beyond said limit.

14. A vehicle steering wheel comprising:

a hub and a rim surrounding said hub, at least one spoke connecting said hub and said rim;

a control receiving an indication of an upcoming turn;

a sensor for sensing rotation of said wheel, said sensor providing a signal of amount of turn of said wheel to said control; and a reconfigurable thin display mounted on said rim, said display communicating with said control such that said display provides an indication of turn signals on said rim.

15. A vehicle steering wheel as recited in claim 14, wherein said display further displays warning signals.

* * * * *